United States Patent Office 3,249,622
Patented May 3, 1966

3,249,622
PROCESS OF PRODUCING 6-AMINOPENICILLAN-
IC ACID COMPOUNDS AND INTERMEDIATES
Siegfried Herrling, Stolberg, Rhineland, and Heinrich
Mueckter, Aachen, Germany, assignors, by mesne
assignments, to the firm Protochemie AG, Glarus,
Glarus, Switzerland, a corporation of Switzerland
No Drawing. Filed Mar. 19, 1962, Ser. No. 180,830
Claims priority, application Germany, Mar. 22, 1961,
C 23,708; Nov. 16, 1961, C 25,516
9 Claims. (Cl. 260—306.7)

The present invention relates to derivatives of amino acids and more particularly to derivatives of 6-aminopenicillanic acid and to a process for making same.

It is one object of the present invention to provide new and valuable derivatives of 6-aminopenicillanic acid and of salts of said acid.

Another object of the present invention is to provide a valuable and highly advantageous process of producing such derivatives of 6-aminopenicillanic acid and of their salts.

A further object of the present invention is to provide new and valuable intermediates soluble in anhydrous solvents which are useful in the preparation of such new derivatives of 6-aminopenicillanic acid.

Still another object of the present invention is to provide a simple and effective process of preparing such intermediates.

Other objects of the present invention and advantageous features thereof will become apparent as the description proceeds.

In principle the derivatives of 6-aminopenicillanic acid according to the present invention correspond to Formula I $$R-X-NH-CH-CH\underset{O=C-N-CH-COOH}{\overset{S}{\diagup}\underset{}{\diagdown}}\overset{CH_3}{\underset{}{\diagup}}C-CH_3 \quad (I)$$

wherein
R represents an alkyl radical which may be substituted or may be interrupted by hetero atoms, or a cycloaliphatic, aromatic, heterocyclic, or aromatic-aliphatic radical which may also be substituted, and
X represents the —CO— group or the —SO$_2$— group.

Starting material in the process according to the present invention is 6-aminopenicillanic acid, which was prepared for the first time by Sakaguchi and Murao (J. Agric. Chem. Soc. Japan, vol. 23 (1950), page 411) by enzymatic hydrolysis of penicillin. Some years later these investigations were repeated for the purpose of using the 6-aminopenicillanic acid in the preparation of penicillins or penicillin-like compounds. Due to the fact that 6-aminopenicillanic acid is soluble only in water or solvents containing water, it was necessary heretofore to use such solvents in the acylation reaction. As a result thereof the acylating agents, for instance, halogenides or anhydrides of carboxylic acids, are destroyed at least partially before acylation sets in. Separation of the acids formed by hydrolysis of the acylating agents, from the resulting penicillins is very difficult.

It is a characteristic feature of the process according to the present invention that, in a first reaction step 6-aminopenicillanic acid is converted into compounds which are soluble in anhydrous solvents and which can be acylated in such solvents. Thereby valuable intermediates are obtained. Such intermediates are prepared by proceeding as follows:

(a) 6-aminopenicillanic acid is reacted, preferably with heating, in the presence of compounds which are capable of binding hydrogen halide, such as ammonia amines, alkali metal carbonates, alkaline earth metal carbonates, and the like, or salts of 6-aminopenicillanic acid, in an anhydrous solvent, preferably an aliphatic or a low-boiling aromatic hydrocarbon or a cyclic ether such as tetrahydrofuran, dioxane, and the like, with a compound of Formula II $$\text{Hal-Si}\underset{R_3}{\overset{R_1}{\diagup}}R_2 \quad (II)$$

wherein
Hal represents halogen, and
$R_1$, $R_2$ and $R_3$ are alkyl, aralkyl, cycloalkyl, or aryl radicals, until formation of the salt of the respective hydrogen halide is completed, whereafter the reaction mixture may be filtered and the solvent is distilled off (b) 6-aminopenicillanic acid is reacted with a compound of Formula III $$R_2-Si-N\underset{R_3}{\overset{R_1}{\diagup}}\overset{R_4}{\underset{R_5}{\diagup}} \quad (III)$$

wherein
$R_1$, $R_2$, and $R_3$ are alkyl, aralkyl, cycloalkyl, or aryl radicals, and
$R_4$ and $R_5$ represent hydrogen, lower alkyl radicals, or the group $$R_2-Si\underset{R_3}{\overset{R_1}{\diagup}}$$

wherein $R_1$ and $R_2$, and $R_3$ represent the same radicals as indicated above.

The reaction may be carried out in the presence of an inert solvent or, preferably, in the presence of an excess of a compound of Formula III serving as solvent. The reaction may be catalytically improved by the addition of a compound of Formula II or of an ammonium salt.

On reacting 6-aminopenicillanic acid with compounds of Formula II or Formula III according to the present invention, there are obtained compounds of Formula IV $$H_2N-CH-CH\underset{O=C-N-CH-COO-Si-R_2}{\overset{S}{\diagup}\underset{}{\diagdown}}\overset{CH_3}{\underset{R_3}{\diagup}}C-CH_3 \quad R_1 \quad (IV)$$

or of Formula IVa $$R_2-Si-HN-CH-CH\underset{O=C-N-CH-COO-Si-R_2}{\overset{S}{\diagup}\underset{}{\diagdown}}\overset{CH_3}{\underset{R_3}{\diagup}}C-CH_3 \quad R_1 \quad (IVa)$$

wherein $R_1$, $R_2$, and $R_3$ represent the same radicals as indicated above.

If an excess of the compounds of Formulas II or III is used, a mixture of compounds of Formulas IV or IVa, respectively, is obtained. The relative amount of the compound of Formula IVa is the higher, the more the excess of the compounds of Formula II or III, respectively, is increased. This fact, however, is of no importance in carrying out the process according to the present invention because the compounds of Formula IVa are subsequently acylated in the same manner as the compounds of Formula IV. Thus in all instances only compounds of Formula I are finally obtained.

Of course, the compounds of Formula IVa may also be prepared by first producing a compound of Formula IV from 6-aminopencillanic acid and then transforming said compound into the compound of Formula IVa, for instance, by treating it with a compound of Formula III.

The compounds of Formulas IV and IVa are highly sensitive to moisture. If in the process of their preparation the compounds of Formulas II or III, respectively, have not been used in excess, the reaction mixture is employed in the subsequent acylation step, if necessary after filtration, without isolation of the compounds of Formula IV or IVa, respectively. If, however, the compounds of Formula IV or IVa, respectively, have been isolated or if in their preparation the compounds of Formula II or III, respectively, have been used in excess, it is possible to free the reaction solution from the solvent, if necessary after filtration, preferably in a vacuum by passing a stream of an inert gas such as nitrogen, hydrogen, or the like therethrough.

The compounds of Formula I are prepared from the compounds of Formula IV or IVa, respectively, or from mixtures of these compounds by reaction with an acid of Formula V, preferably in the presence of a solvent,

R—Y (V)

wherein

R represents the same substituents as indicated in Formula I, and

Y indicates the carboxyl group —COOH or the sulfonic acid group —SO$_3$H.

In place of the acid itself, there may be used a functional derivative of the acid of Formula V such as its halogenide, its anhydride, and the like. Acylation is preferably effected in the presence of a compound which is capable of splitting off water or binding acids, for instance, in the presence of a carbodiimide, an amine, or an alkali metal or alkaline earth metal hydroxide or carbonate. The compounds of Formula I are then set free and recovered from the resulting acylation products by hydrolysis or alcoholysis, respectively. If desired, the compounds of Formula I can be converted into their salts with inorganic or organic bases, preferably with pharmaceutically acceptable, substantially non-toxic bases.

Acylation can be carried out in solvents free of water or hydroxyl group, for instance, by using hydrocarbons or cyclic ethers wherein the compounds of Formulas IV or IVa are soluble. Such solvents permit to use functional derivatives of the acids of Formula V which would be hydrolyzed in the presence of solvents containing hydroxyl groups or which would react otherwise with such solvents. The process according to the present invention thus has the advantage that it is not necessary to use the acylating agent in excess and that the compounds of Formula I can immediately be obtained in a substantially pure state.

Hydrolysis or alcoholysis, respectively, of the intermediate products obtained by acylating compounds of Formula IV or IVa, respectively, in order to produce the compounds of Formula I is preferably effected by adding water or a lower aliphatic alcohol or a phenol to the reaction mixture. Thereby, the reactant which causes splitting off of the silyl radicals may be added at once. It is, however, also possible to cause a gas carrying water or alcohol vapors, for instance, moist air, to contact the reaction mixture.

The following examples serve to further illustrate the present invention without, however, limiting the same thereto.

*Example 1*

1.1 g. of trimethyl chlorosilane are added to 2.5 g. of potassium 6-aminopenicillanate in 50 ml. of absolute benzene while stirring. The mixture is refluxed for 5 hours while stirring is continued. After cooling, the reaction mixture is filtered. The filtrate which contains the trimethyl silyl ester of 6-aminopenicillanic acid is used either as such for further reactions or is freed by distilling off the benzene in a vacuum while passing a dry stream of nitrogen therethrough. The reaction product is obtained in the form of a viscous oil in an almost quantitative yield. On triturating the reaction product with a small amount of petroleum ether and allowing the mixture to stand for some time, the product solidifies to a crystalline mass which attains a red-brown color at about 175° C. and decomposes with foaming at about 220–225° C.

*Example 2*

2.2 g. of 6-aminopenicillanic acid are suspended in 50 ml. of absolute benzene. 2.4 g. of triethylamine and thereafter 2.4 g. of trimethyl chlorosilane are added thereto drop by drop while stirring. The mixture is refluxed for 5 hours while stirring, cooled, and filtered whereby a solution of N-trimethyl silyl 6-aminopenicillanic acid trimethyl silyl ester is obtained. The oil remaining on distilling off the benzene solidifies on standing for some time. On heating, the compound slowly decomposes until at about 225° C. complete decomposition has taken place.

*Example 3*

The process is the same as described in Example 2, whereby however, in place of triethylamine, 2.5 g. of N-ethyl piperidine are used as acid binding agent.

*Example 4*

2.4 g. of trimethyl chlorosilane are added to 2.2 g. of 6-aminopencillanic acid in 50 ml. of absolute toluene. The mixture is stirred and boiled under reflux for 5 hours whereby a stream of dry ammonia is passed therethrough. Thereafter, a vigorous stream of dry nitrogen is passed through the boiling solution until the ammonium chloride formed in the reaction is removed from the solution. The ammonium chloride sublimes into the reflux condenser. The remaining solution contains N-trimethyl silyl 6-amino penicillanic acid trimethyl silyl ester which can be isolated by distilling off the toluene in a vacuum in a nitrogen stream.

*Example 5*

0.5 g. of ammonium sulfate are added to a suspension of 21.6 g. of 6-aminopenicillanic acid in 50 ml. of hexamethyl disilazane. The mixture is heated at 80° C. for 4 to 5 hours while stirring and passing a stream of dry nitrogen therethrough. Thereafter, the excess of hexamethyl disilazane is distilled off in a vacuum, the residue is dissolved in warm petroleum ether, and the resulting solution is filtered. On cooling, 6-aminopenicillanic acid trimethyl silyl ester crystallizes from the filtrate. The mother liquor yields, on evaporation, an oil which crystallizes after some time and represents the N-trimethyl silyl 6-amino penicillanic acid trimethyl silyl ester.

*Example 6*

A suspension of 21.6 g. of 6-amino penicillanic acid in 50 ml. of hexamethyl disilazane is boiled under reflux first at 80° C. for 4 to 5 hours and then at 120° C. for 30 minutes while stirring and passing a stream of dry nitrogen therethrough. The reaction mixture is freed by distillation in a vacuum of the excess of hexamethyl disilazane. A viscous oil is obtained which is a mixture of 6-aminopenicillanic acid trimethyl silyl ester and N-trimethyl silyl 6-aminopenicillanic acid trimethyl silyl ester. This mixture is dissolved in such a quantity of dry tetrahydrofuran that the volume of the solution amounts to 100 ml.

*Example 7*

1.82 g. of triethylamine are added to 15 ml. of the solution obtained in Example 6 corresponding to 3.24 g. of 6-aminopenicillanic acid. A solution of 3.28 g. of α-phenyl isobutyryl chloride in 10 ml. of tetrahydrofuran is added drop by drop thereto at a temperature below 5° C. while stirring. After standing for 3 hours, the mixture is poured into 250 ml. of butyl acetate and cooled to 0–5° C. 2 ml. of isopropanol are added thereto. After 45 minutes the mixture is filtered and the filtrate is adjusted by the addition of a solution of potassium α-ethyl hexanoate in butyl acetate to a pH of 6.5. On adding ether, filtering, and washing the filter residue with butyl acetate, acetone, and ether, potassium N-(α-phenyl isobutyryl)-6-aminopenicillanate is isolated in a yield of 67% of the theoretical yield. On heating, the product decomposes at 195–200° C.

When using, in place of α-phenyl isobutyryl chloride, other acid chlorides such as phenoxy isobutyryl chloride, α-acetoxy propionyl chloride, or 1-phenoxy cyclopentane-1-carboxylic acid chloride, and otherwise proceeding as described hereinabove, the potassium salts of the corresponding N-acylated 6-aminopenicillanic acids, namely of N-(phenoxy isobutyryl)-6-aminopenicillanic acid, N-(α-acetoxy propionyl)-6-aminopenicillanic acid, or N-(1-phenoxy cyclopentane-1-carboxy) - 6 - aminopenicillanic acid are obtained.

*Example 8*

20 ml. of the solution obtained according to Example 6 are cooled to 0° C. 2.2 g. of triethylamine are added thereto. A solution of 4 g. of 2,5-dimethoxy benzoyl chloride in 20 ml. of tetrahydrofuran is admixed drop by drop while stirring. After 30 minutes a mixture of 10 ml. of tetrahydrofuran and 2 ml. of ethanol is added while stirring and, after 15 more minutes, the reaction mixture is filtered. The filtrate is neutralized by the addition of alcoholic potassium hydroxide solution and is then poured under stirring into 300 ml. of ether. The potassium salt of N-(2′,5′-dimethoxy benzoyl)-6-aminopenicillanic acid is obtained in a yield of 67% of the theoretical yield. The compound decomposes at about 200–205° C.

*Example 9*

1.52 g. of triethylamine and 1.56 g. of ethyl chloroformate are added to a solution of 6 g. of tri-(bromomethyl) acetic acid in 20 ml. of dry tetrahydrofuran. The precipitated triethylamine hydrochloride is filtered off. The resulting solution contains the corresponding mixed anhydride. 15 ml. of the solution obtained in example 6 are added to said solution. After standing for 2 hours, the mixture is poured into 250 ml. of butyl acetate and cooled to 0–5° C. 2 ml. of 95% ethyl alcohol are added thereto. After 15 minutes the mixture is filtered and the filtrate is worked up as described in Example 7. The potassium salt of N-[tri-(bromomethyl)-acetyl]-6-aminopenicillanic acid is obtained thereby in a yield of 57% of the theoretical yield. On heating, the salt attains a brown color at about 200° C. and decomposes at 210–212° C.

When using, in place of tri-(bromomethyl) acetic acid, N-(α-phenoxy propionyl) glycine or N-acetyl-β-alanine, respectively, and otherwise proceeding as described hereinabove, the potassium salts of the corresponding N-acylated 6-aminopenicillanic acids, namely of N-(α-phenoxy propionyl)-6-aminopenicillanic acid or of N-acetyl-6-aminopenicillanic acid are obtained.

*Example 10*

10 ml. of tetrahydrofuran and 1.1 g. of triethylamine are added to 10 ml. of the solution obtained according to Example 6. A solution of 2.62 g. of α-phenoxy propionyl chloride in 10 ml. of tetrahydrofuran is added drop by drop at a temperature slightly below 5° C. to said mixture while stirring. Stirring is continued for 30 more minutes. The mixture is then added with stirring to 300 ml. of ice water. After 10 minutes the mixture is filtered. The filtrate is cooled. 200 ml. of butyl acetate are poured thereon to form a layer. After acidifying to a pH of 2.0 and shaking, the aqueous layer is separated and the extraction with butyl acetate is repeated several times. The organic solvent extracts are combined, shaken with water, dried over anhydrous sodium sulfate, and filtered. The filtrate is treated with a solution of potassium α-ethyl hexanoate in butyl acetate to adjust the pH to 6.5. Ether is added thereto. The precipitate is filtered off and washed successively with butyl acetate, acetone, and ether. The potassium salt of N-(α-phenoxy propionyl)-6-aminopenicillanic acid is obtained in a yield of 92% of the theoretical yield. The compound decomposes at about 229–234° C.

*Example 11*

1.6 g. of triethylamine are added to 15 ml. of the solution obtained according to Example 6. A solution of 2.84 g. of benzene sulfonyl chloride in 10 ml. of tetrahydrofuran is added drop by drop thereto at a temperature of 5° C. while stirring. After one hour 2 ml. of methanol are added. The mixture is stirred for 30 minutes and is filtered. The pH of the filtrate is adjusted by the addition of N-ethyl piperidine to a pH of 7.0. Ether is added and the mixture is cooled. Thus the N-ethyl piperidine salt of 6-benzene sulfonamidopenicillanic acid is obtained in a yield of 72% of the theoretical yield. Melting point: 165–167° C.

*Example 12*

A mixture of 100 ml. of absolute benzene, 2.1 g. of 6-aminopenicillanic acid, and 0.89 g. of hexamethyl disilazane is refluxed until evolution of ammonia ceases. A solution of 2.7 g. of the mixed anhydride of phenoxy acetic acid and ethyl carbonate, obtained from phenoxy acetic acid and ethyl chloroformate in the presence of triethylamine, in 40 ml. of absolute benzene is added to said solution. The reaction mixture is stirred for several hours and is then added, while stirring vigorously, to a solution of 5 g. of sodium hydrogen carbonate in 200 ml. of water. After thorough mixing, the organic solvent layer is separated. 50 ml. of butyl acetate are added to form a layer to the aqueous layer and the aqueous layer is acidified to a pH 1–2. After shaking, the organic solvent layer is separated. Extraction of the aqueous layer with butyl acetate is repeated twice. The butyl acetate extracts are combined, dried over anhydrous sodium sulfate, and filtered. The filtrate is neutralized by the addition of a solution of potassium α-hexyl hexanoate in butanol. Thereby the potassium salt of N-phenoxy acetyl-6-aminopenicillanic acid is obtained in a yield of 92% of the theoretical yield. The compound decomposes at 258–262° C.

In place of trimethyl chlorosilane and hexamethyl disilazane employed as the one reactant in the preceding Examples 1 to 6, there may be used equimolecular amounts of other silanes, silylamines and disilazanes while otherwise the procedure is the same as described in said examples. Such other silanes, silylamines and disilazanes useful in the process according to the present invention are, for instance, triethyl chlorosilane,
triethyl bromosilane,
tri-n-propyl chlorosilane,
tri-n-butyl chlorosilane,
methyl diethyl chlorosilane,
dimethyl ethyl chlorosilane,
phenyl dimethyl bromosilane,
benzyl methyl ethyl chlorosilane,
phenyl ethyl methyl chlorosilane,
triphenyl chlorosilane,
triphenyl fluorosilane,
tri-o-tolyl chlorosilane,
tri-p-dimethylaminophenyl chlorosilane,
N-ethyl triethyl silylamine,
hexaethyl disilazane,
triphenyl silylamine,
tri-n-propyl silylamine,
tetraethyl dimethyl disilazane,
tetramethyl diethyl disilazane,
tetramethyl diphenyl disilazane,
hexaphenyl disilazane,
hexa-p-tolyl disilazane.

In place of the acid chlorides, anhydrides, or mixed anhydrides used in Examples 7 to 12 for reaction with the silyl substituted 6-aminopenicillanic acids, there may be employed other acids, acid halogenides, acid anhydrides, mixed acid anhydrides or esters while otherwise the procedure is the same as described in said examples. Such other acids or their functional derivatives are, for instance, phenyl acetic acid,
n-hexanoic acid,
Δ₂-n-hexenoic acid,
Δ₃-n-hexenoic acid,
n-octanoic acid,
benzyl sulfonic acid,
phthalic acid,
ethyl mercaptoacetic acid,
phenyl acetyl glycine,
phenoxy acetyl glutamic acid,
o-chlorophenyl acetyl alanine,
α-methyl phenoxy acetic acid,
α-methyl phenoxy acetyl thioglycollic acid,
2,6-dimethoxy benzoic acid,
bromoacetic acid,
α-chloro-n-butyric acid,
β-chloro-n-propionic acid,
β-bromo-n-propionic acid,
2-chlorophenoxy acetic acid,
2-methoxy phenoxyacetic acid,
phenylmercapto acetic acid,
n-butoxyacetic acid,
4-nitrophenoxyacetic acid,
3-chloro-4-methyl phenoxyacetic acid,
3,4-dimethyl phenoxyacetic acid,
pyridyloxyacetic acid,
cyclohexylacetic acid,
thienyl-2-carboxylic acid,
α-(2-thienyl)propionic acid,
acrylic acid,
2-furoic acid,
cyclohexyl carboxylic acid,
α-carbobenzoxyamino phenyl acetic acid,
α,ε-dicarbobenzoxyaminocaproic acid,
pyridine-2-carboxylic acid,
pyridine-3-carboxylic acid,
pyridine-4-carboxylic acid,
5-nitro-2-furoic acid,
quinoline-4-carboxylic acid,
γ-methylmercapto-α-carbobenzoxyaminobutyric acid.

In place of benzene and toluene used as solvents in the preparation of the silyl derivatives of penicillanic acid according to Examples 1 to 4 and 12, there may be employed other anhydrous solvents free of hydroxyl group such as tetrahydrofuran, dioxane, n-hexane, n-heptane, cyclohexane, n-octane, cyclopentane, pentane, xylene.

In place of tetrahydrofuran and benzene used as anhydrous solvents free of hydroxyl groups used in Examples 7 to 12, there may be employed, for instance, dioxane, n-hexane, cyclohexane, cyclopentane, pentane, toluene, n-heptane, n-octane.

Not only the potassium salts of the 6-aminopenicillanic acid derivatives may be prepared but also other salts, for instance, the sodium salts, the calcium salts, the procaine salts, the salts with 1-p-chlorobenzyl-2-pyrrolidinomethyl benzimidazole, the salts with N,N'-dibenzyl ethylendiamine.

The free penicillanic acids are obtained from their salts in a manner known per se, for instance, by acidifying an aqueous solution of the sodium or the potassium salt, extracting with an organic solvent such as ether, butyl acetate, chloroform and evaporation of the organic extracts.

Of course, many changes and variations in the reactants used, the reaction conditions, temperature and duration, the solvents employed, the methods of isolating and purifying the new silyl derivatives of 6-aminopenicillanic acid and the N-acylated 6-aminopenicillanic acid compounds themselves, and the like may be made by those skilled in the art in accordance with the principles set forth herein and in the claims annexed hereto.

We claim:
1. The silyl ester of 6-aminopenicillanic acid of the formula

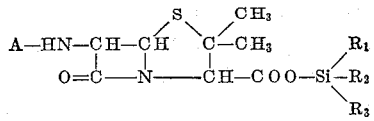

wherein

A is a member selected from the group consisting of hydrogen and the group of the formula

and $R_1$, $R_2$, and $R_3$ are members selected from the group consisting of lower alkyl with 1 to 5 carbon atoms, benzyl, phenyl ethyl, cyclohexyl, cyclopentyl, phenyl, and tolyl.

2. The trimethyl silyl ester of 6-aminopenicillanic acid.
3. The trimethyl silyl ester of N-trimethyl silyl-6-aminopenicillanic acid.
4. In the process of producing N-acylated 6-aminopenicillanic acid compounds of the formula

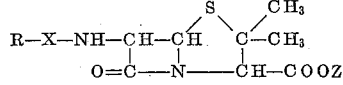

wherein

R is the organic radical of an acid selected from the group consisting of an organic carboxylic acid and an organic sulfonic acid;

X is a member selected from the group consisting of the carbonyl group —CO— and the sulfonyl group —SO₂—; and Z is a member selected from the group consisting of hydrogen and a cation forming a salt with said 6-aminopenicillanic acid compound, the steps which comprise reacting a silyl ester of 6-aminopenicillanic acid of the formula

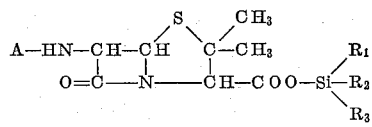

wherein

A is a member selected from the group consisting of hydrogen and the group of the formula

and $R_1$, $R_2$, and $R_3$ are members selected from the group consisting of lower alkyl with 1 to 5 carbon atoms, benzyl, phenyl ethyl, cyclohexyl, cyclopentyl, phenyl, and tolyl with an acylating agent selected from the group consisting of an acid of the formula

wherein

R represents the same organic radical as indicated above, and

Y is a member selected from the group consisting of the carboxyl group —COOH and the sulfonic acid group —SO₃H, and a functional derivative of such an acid under anhydrous conditions until acylation of the amino group of said 6-aminopenicillanic acid is completed, and hydrolyzing the silyl ester group of the resulting silyl ester of an N-acylated 6-aminopenicillanic acid by the action of a hydrolyzing agent selected from the group consisting of water, a lower aliphatic alcohol, and a phenol.

5. The process according to claim 4, wherein acylation is effected in the presence of an acid binding agent.

6. The process according to claim 4, wherein acylation is effected in the presence of a dehydrating agent.

7. The process according to claim 4, wherein the solvent is a member selected from the group consisting of an aliphatic hydrocarbon, a low boiling aromatic hydrocarbon, and a cyclic ether.

8. In a process of producing N-acylated 6-aminopenicillanic acid compounds of the formula $$R-X-NH-CH-CH \overset{S}{\underset{}{\diagup}} \overset{CH_3}{\underset{}{\diagdown}} C-CH_3$$
$$O=C-N-CH-COOZ$$

wherein

R is the organic radical of an acid selected from the group consisting of an organic carboxylic acid and an organic sulfonic acid;

X is a member selected from the group consisting of the carbonyl group —CO— and the sulfonyl group —$SO_2$—; and Z is a member selected from the group consisting of hydrogen and a cation forming a salt with said 6-aminopenicillanic acid compound, the steps which comprise adding a silicon compound of the formula $$\begin{array}{c} R_1 \\ R_2-Si-B \\ R_3 \end{array}$$

wherein $R_1$, $R_2$, and $R_3$ represent members selected from the group consisting of lower alkyl with 1 to 5 carbon atoms, benzyl, phenyl ethyl, cyclohexyl, cyclopentyl, phenyl, and tolyl;

B is a member selected from the group consisting of halogen and the group of the formula $$-N \overset{R_4}{\underset{R_5}{\diagdown}}$$

and $R_4$ and $R_5$ are members selected from the group consisting of hydrogen, lower alkyl with 1 to 5 carbon atoms, and the group of the formula $$\begin{array}{c} R_1 \\ R_2-Si- \\ R_3 \end{array}$$

to 6-aminopenicillanic acid in an anhydrous solvent in the presence of a halogen hydride-binding agent, when B is halogen, reacting the mixture until formation of the silyl ester is completed, reacting the resulting silyl ester of 6-aminopenicillanic acid of the formula $$A-HN-CH-CH \overset{S}{\underset{}{\diagup}} \overset{CH_3}{\underset{}{\diagdown}} C-CH_3$$
$$O=C-N-CH-COO-Si \overset{R_1}{\underset{R_3}{-R_2}}$$

wherein

A is a member selected from the group consisting of hydrogen and the group of the formula $$Si \overset{R_1}{\underset{R_3}{-R_2}}$$

and $R_1$, $R_2$, and $R_3$ are the same members as indicated above, with an acylating agent selected from the group consisting of an acid of the formula $$R-Y$$

wherein

R represents the same organic radical as indicated above, and

Y is a member selected from the group consisting of the carboxyl group COOH and the sulfonic acid group —$SO_3H$, and a functional derivative of such an acid under anhydrous conditions until acylation of the amino group of said 6-aminopenicillanic acid is completed, and hydrolyzing the silyl ester group of the resulting silyl ester of an N-acylated 6-aminopenicillanic acid by the action of a hydrolyzing agent selected from the group consisting of water, a lower aliphatic alcohol, and a phenol.

9. A method which comprises reacting 6-aminopenicillanic acid with an excess of a compound of the formula $$\begin{array}{c} R \\ R-Si-N \\ R \end{array} \overset{R'}{\underset{R'}{\diagdown}}$$

wherein

R is lower alkyl, and

R' is a member selected from the group consisting of hydrogen and lower alkyl in an inert organic solvent and thereafter contacting the 6-aminopenicillanic acid derivative thus formed with a member selected from the group consisting of an organic carboxylic acid halide and an organic carboxylic acid anhydride.

References Cited by the Examiner

UNITED STATES PATENTS

| | | | |
|---|---|---|---|
| 2,746,956 | 5/1956 | Speir | 260—239.1 |
| 2,941,995 | 6/1960 | Doyle et al. | 260—239.1 |

NICHOLAS S. RIZZO, *Primary Examiner.*

JAMES W. ADAMS, *Examiner.*